United States Patent
Nakarmi et al.

(10) Patent No.: US 11,877,156 B2
(45) Date of Patent: Jan. 16, 2024

(54) METHODS, UE AND NODES FOR HANDLING SYSTEM INFORMATION PROTECTION

(71) Applicant: Telefonaktiebolaget LM Ericsson (publ), Stockholm (SE)

(72) Inventors: Prajwol Kumar Nakarmi, Sollentuna (SE); Oscar Ohlsson, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 120 days.

(21) Appl. No.: 17/606,793

(22) PCT Filed: Apr. 9, 2020

(86) PCT No.: PCT/SE2020/050375
§ 371 (c)(1),
(2) Date: Oct. 27, 2021

(87) PCT Pub. No.: WO2020/222686
PCT Pub. Date: Nov. 5, 2020

(65) Prior Publication Data
US 2022/0167169 A1 May 26, 2022

Related U.S. Application Data

(60) Provisional application No. 62/839,828, filed on Apr. 29, 2019.

(51) Int. Cl.
*H04W 12/03* (2021.01)
*H04W 12/106* (2021.01)
*H04W 76/20* (2018.01)
*H04W 12/0431* (2021.01)

(52) U.S. Cl.
CPC ......... *H04W 12/106* (2021.01); *H04W 12/03* (2021.01); *H04W 12/0431* (2021.01); *H04W 76/20* (2018.02)

(58) Field of Classification Search
CPC .............................. H04W 12/10; H04W 76/20
See application file for complete search history.

(56) References Cited

U.S. PATENT DOCUMENTS

2015/0195774 A1 7/2015 Lee et al.
2020/0145821 A1* 5/2020 Lee ...................... H04W 12/037
2020/0344611 A1* 10/2020 Lee ...................... H04W 12/69

OTHER PUBLICATIONS

3GPP, "3GPP TR 33.899 V1.3.0", 3rd Generation Partnership Project; Technical Specification Group Services and System Aspects; Study on the security aspects of the next generation system (Release 14), Aug. 2017, 1-605.

(Continued)

*Primary Examiner* — Michael T Vu
(74) *Attorney, Agent, or Firm* — Murphy, Bilak & Homiller, PLLC

(57) ABSTRACT

The present disclosure relates to a method performed by a UE (103) in a communications system (100). The UE (103) provides information indicating its SI protection capability to a node (101, 105). The SI protection capability is associated with the UE's (103) capability and need to verify SI signatures. The UE (103) obtains SI protection information from the node (101, 105), and uses the SI protection information.

20 Claims, 9 Drawing Sheets

(56) References Cited

OTHER PUBLICATIONS

Ericsson, "New solution (SERSI—SERving network controlled SI signatures)", 3GPP TSG-SA WG3 Meeting #95-Bis, S3-191990 (revision of S3-19xabc), Sapporo (Japan), Jun. 24-28, 2019, 1-6.
Ericsson, "Updates to solution #7—capability negotiation", 3GPP TSG-SA3 Meeting #97, S3-194202 (Revision of 33-19xxxx), Reno (US), Nov. 18-22, 2019, 1-7.

* cited by examiner

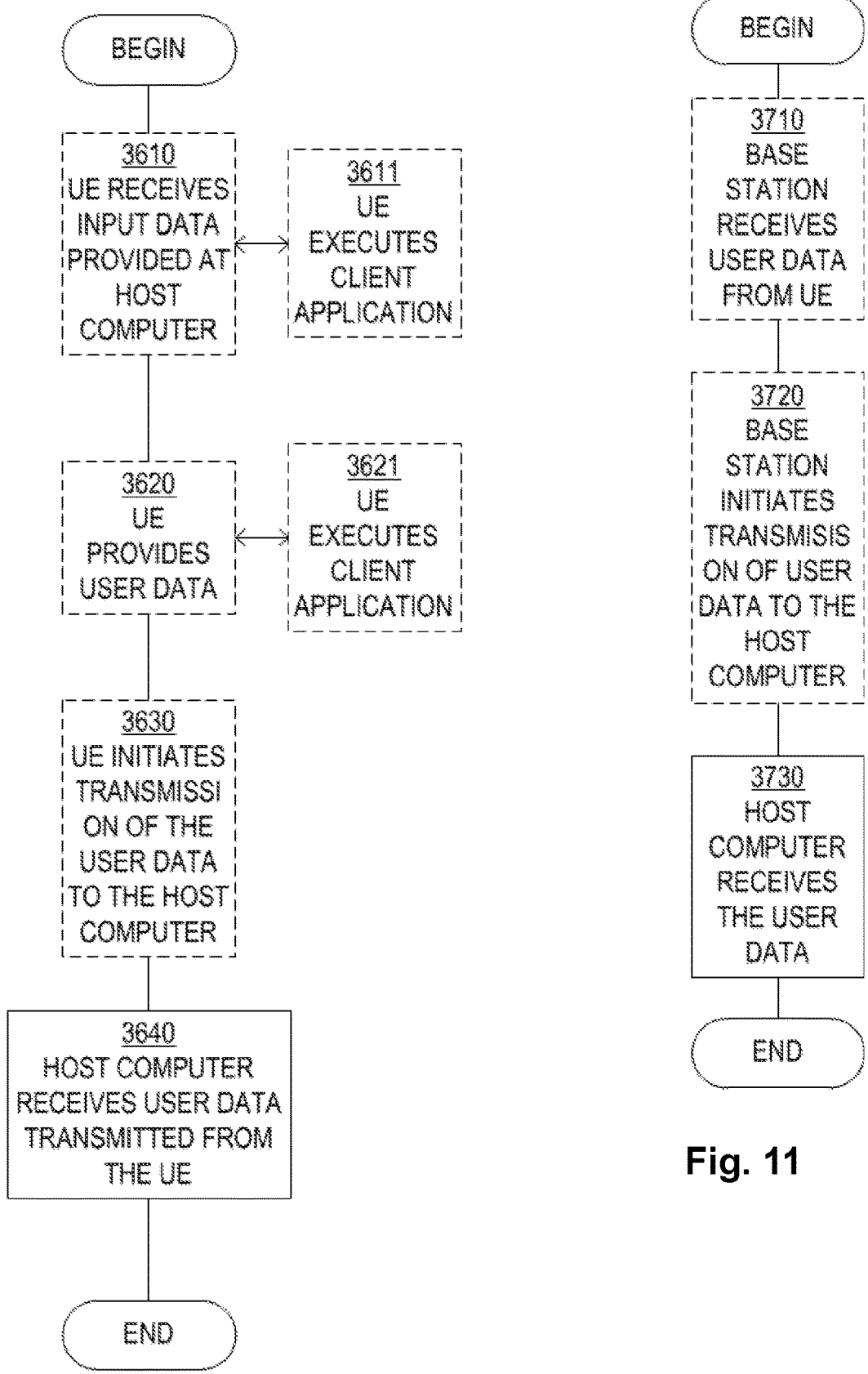

METHODS, UE AND NODES FOR HANDLING SYSTEM INFORMATION PROTECTION

TECHNICAL FIELD

The embodiments herein relate generally to a User Equipment (UE), a method performed by the UE, a node and a method performed by the node.

BACKGROUND

System Information (SI) is information that is repeatedly broadcast by the node and which needs to be acquired by the UE in order for it to be able to access and, in general, operate properly within the network and within a specific cell. The SI provides information about the cell or the network to the UEs attached to nodes covering the cell or network. The SI comprises a Mater Information Block (MIB) and System Information Blocks (SIB).

In New Radio (NR), the SI may be delivered using at least one of the following two different mechanisms relying on two different transport channels:
- A limited amount of SI, corresponding to the so-called MIB, is transmitted using the Broadcast Channel (BCH).
- The main part of the SI, corresponding to different so-called SIBs, is transmitted using the Downlink-Shared Channel (DL-SCH).

The BCH is a downlink channel, i.e. a transport channel or communication channel in the direction from the node to the UE, used by the node, e.g. a base station, to broadcast information to the UE's. The information may be cell information and/or at least part of the SI.

DL-SCH is a transport channel or communication channel in the direction from the node to the UE, used for the transmission of user data, dedicated control and user-specific higher layer information and downlink SI from the node to the UE.

The MIB comprises SI parameters needed to bootstrap the UE and to obtain the rest of the SI. Unlike the SIBs, the MIB has a fixed size and the only way to add new information is to use one of the spare bits in MIB that have been reserved for future use. The term "bootstrap the UE" may refer to that the UE is started, self-started, restarted, started-up, etc.

The MIB may be described as a static part of SI, and the SIBs may be described as a dynamic part of the SI.

The first SIB, SIB1, comprises the SI that the UE needs to know before it may access the system. SIB1 refers to System Information Block Type1. SIB1 is always periodically broadcast over the entire cell area. An important task of SIB1 is to provide the information the UE needs in order to carry out initial random access. SIB1 also comprises scheduling information for the remaining SIBs, e.g. at least one of SIB2-SIB13. MIB and SIB1 together forms what is known as the Minimum SI. SIBs, except the SIB1, are conveyed in SI messages, i.e. SIB2-SIB13 are conveyed in SI messages.

The remaining SIBs, not including SIB1, are known as the Other SI and comprise the SI that a UE does not need to know before accessing the communications system. These SIBs may also be periodically broadcast similar to the SIB1. Alternatively, these SIBs may be transmitted on demand, that is, only transmitted when explicitly requested by the UE. This implies that the node may avoid periodic broadcast of these SIBs in cells where no UE is currently camping, thereby allowing for enhanced network energy performance. At least one of the following SIBs is defined:
- SIB2 comprises cell re-selection information, mainly related to the serving cell;
- SIB3 comprises information about the serving frequency and intra-frequency neighbouring cells relevant for cell re-selection, comprising cell re-selection parameters common for a frequency as well as cell specific re-selection parameters;
- SIB4 comprises information about other NR frequencies and inter-frequency neighbouring cells relevant for cell re-selection, comprising cell re-selection parameters common for a frequency as well as cell specific re-selection parameters;
- SIB5 comprises information about Evolved-Universal Terrestrial Radio Access (E-UTRA) frequencies and E-UTRA neighbouring cells relevant for cell re-selection, e.g. comprising cell re-selection parameters common for a frequency as well as cell specific re-selection parameters;
- SIB6 comprises an Earthquake & Tsunami Warning System (ETWS) primary notification;
- SIB7 comprises an ETWS secondary notification;
- SIB8 comprises a Commercial Mobile Alert System (CMAS) warning notification;
- SIB9 comprises information related to Global Positioning System (GPS) time and Coordinated Universal Time (UTC).

Note that there may be additional SIBs not mentioned above and which are in addition to the ones above. These additional SIBs may be at least one of e.g. SIB10, SIB11, SIB12, SIB13 etc.

Three types of Radio Resource Control (RRC) message are used to transfer SI: the MIB message, the SIB1 message and SI messages. An SI message, of which there may be several, comprises one or more SIBs which have the same scheduling requirements, i.e. the same transmission periodicity. The mapping of SIBs into SI messages as well as the scheduling information for those SI messages is defined in SIB1.

Today, SI is transmitted without integrity protection which means that an attacker can manipulate the SI without the UE to being able to detect it. As a result, the UE may use that manipulated SI and be tricked to camp to a rogue cell leading to denial of services. The UE may also end up reporting false and/or incorrect information about neighbor cells to the genuine network which in turn could impact various Self-Organizing Networks (SON) functions.

To mitigate this type of attacks, one solution may be to digitally sign the SI. However, digitally signing the system information may not always be possible because the network and the UE do not know if they support digitally signing the system information.

Therefore, there is a need to at least mitigate or solve these issues.

SUMMARY

An objective of embodiments herein is therefore to obviate at least one of the above disadvantages and to improve handling of signatures.

According to a first aspect, the object is achieved by a method performed by a UE in a communications system. The UE provides information indicating its SI protection capability to a node. The SI protection capability is associated with the UE's capability and need to verify SI signatures. The UE obtains SI protection information from the node, and the UE uses the SI protection information.

According to a second aspect, the object is achieved by a UE in a communications system. The UE is adapted to provide information indicating its SI protection capability to a node. The SI protection capability is associated with the UE's capability and need to verify SI signatures. The UE is adapted to obtain SI protection information from the node, and to use the SI protection information.

According to a third aspect, the object is achieved by a method performed by a node in a communications system. The node obtains information indicating SI protection capability from a UE. The SI protection capability is associated with the UE's capability and need to verify SI signatures. The node determines SI protection information based on the information indicating SI protection capability. The node provides the determined SI protection information to the UE.

According to a fourth aspect, the object is achieved by a node in a communications system. The node is adapted to obtain information indicating SI protection capability from a UE. The SI protection capability is associated with the UE's capability and need to verify SI signatures. The node is adapted to determine SI protection information based on the information indicating SI protection capability. The node is adapted to provide the determined SI protection information to the UE.

Embodiments herein afford many advantages, of which a non-exhaustive list of examples follows:

An advantage of the embodiments herein is that they enable negotiation of SI protection information between the UE and the node.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description, and by reference to the appended drawings illustrating the embodiments and in which:

FIG. 10 is a flowchart depicting embodiments of a method in a communications system comprising a host computer, a base station and a UE.

FIG. 11 is a flowchart depicting embodiments of a method in a communications system comprising a host computer, a base station and a UE.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to that the UE provides information indicating its SI protection capability to the node. The node uses the information indicating the SI protection capability of the UE to decide whether or not to provide SI protection information to the UE. The node may provide stripped down SI protection information to the UE. The node may provide different versions of SI protection information to different UEs with different SI protection capabilities.

Figure 1:
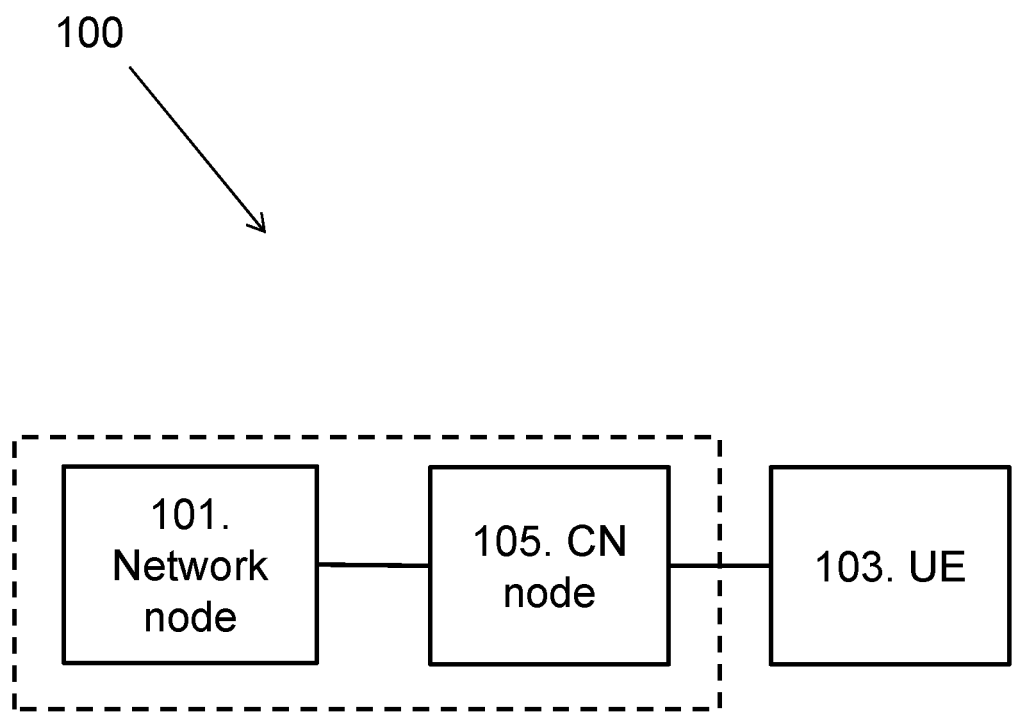
FIG. 1 is a schematic block diagram illustrating an example of a communications system.

FIG. 1 depicts a communications system 100, which may be a wireless communications system, sometimes also referred to as a wireless communications network, cellular radio system, or cellular network, in which embodiments herein may be implemented. The communications system 100 may be a Fifth Generation (5G) system, 5G network, NR-U or Next Gen system or network. The communications system 100 may alternatively be a younger system than a 5G system. The communications system 100 may support other technologies such as, for example, Long-Term Evolution (LTE), LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, Narrowband-Internet of Things (NB-IoT). Thus, although terminology from 5G/NR and LTE may be used in this disclosure, this should not be seen as limiting the scope herein to only the aforementioned systems.

The communications system 100 comprises one or a plurality of network nodes, whereof the network node 101 is depicted in the non-limiting example of FIG. 1. The network node 101a may be a radio network node, such as a radio base station, a radio access network node, an access network node or any other network node with similar features capable of serving a UE 103, such as a wireless device or a machine type communication device, in the communications system 100. The network node 101 may be an evolved NodeB (eNB), gNB, Master eNB (MeNB), Radio Network Controller (RNC), Node B (NB), etc.

The communications system 100 may cover a geographical area which may be divided into cell areas. Each cell area may be served by a network node, although, one network node may serve one or several cells. Note that any n number of cells may be comprised in the communications system 100, where n is any positive integer. A cell is a geographical area where radio coverage is provided by the network node 101 at a network node site. Each cell is identified by an identity within the local network node area, which is broadcast in the cell. In FIG. 1, network node 101 may serves a cell. The network node 101 may be of different classes, such as, e.g., macro base station (BS), home BS or pico BS, based on transmission power and thereby also cell size. The network node 101 may be a distributed node, such as a virtual node in the cloud, and it may perform its functions entirely on the cloud, or partially, in collaboration with another network node.

The network node 101 may be directly or indirectly connected to one or more core networks (CN), e.g. represented by a CN node 105 in FIG. 1. Note that only one CN Node 105 is shown in FIG. 1 for the sake of simplicity, but any other suitable number of CN nodes 105 may be located in the communications system 100. The CN node 105 may be any suitable CN node such as e.g. a Serving Gateway (SGW), Packet Data Network Gateway (PGW), Gateway General Packet Radio Services (GPRS) Support Node (GGSN), Serving General Packet Radio Services (GPRS) Support Node (SGSN), Mobility Management Entity (MME), Access and Mobility Management Function (AMF), User Plane Function (UPF), Session Management Function (SMF), Home Location Register (HLR), Home Subscriber Server (HSS), Policy Charging Function (PCF), Application Function (AF), Unified Data Management (UDM), Authentication Server Function (AUSF), Network Repository Function (NRF), Network Exposure Function (NEF), Network Slice Selection Function (NSSF), Charging Function (CHF) etc. The CN node 105 may be referred to as a serving CN node, i.e. the CN node 105 which is currently serving the UE 103. The CN node 105 may also referred to as a first CN node, or a home CN node.

One or a plurality of UEs 103 is located in the communications system 100. Only one UE 103 is exemplified in FIG. 1 for the sake of simplicity. A UE 103 may also be referred to simply as a device. The UE 103, e.g. a LTE UE or a 5G/NR UE, may be a wireless communication device which may also be known as e.g. a wireless device, a mobile terminal, wireless terminal and/or mobile station, a mobile telephone, cellular telephone, or laptop with wireless capability, just to mention some further examples. The UE 103 may be a device by which a subscriber may access services offered by an operator's network and services outside operator's network to which the operator's radio access network and CN provide access, e.g. access to the Internet. The UE 103 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device, Internet of Things (IOT) device, terminal device, communication device or any type of consumer electronic, for instance but not limited to television, radio, lighting arrangements, tablet computer, laptop or Personal Computer (PC). The UE 103 may be portable, pocket storable, hand held, computer comprised, or vehicle mounted devices, enabled to communicate voice and/or data, via the radio access network, with another entity, such as another UE, a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in the communications system 100.

The UE 103 is enabled to communicate wirelessly within the communications system 100. The communication may be performed e.g. between two UEs 103, between a UE 103 and a regular telephone, between the UE 103 and a network node 101, between network nodes, and/or between the UEs 103 and a server via the radio access network and possibly one or more CNs and possibly the internet.

The network node 101 may be configured to communicate in the communications system 100 with the UE 103 over a communication link, e.g. a radio link.

It should be noted that the communication links in the communications network may be of any suitable kind comprising either a wired or wireless link. The link may use any suitable protocol depending on type and level of layer (e.g. as indicated by the Open Systems Interconnection (OSI) model) as understood by the person skilled in the art.

Figure 2:
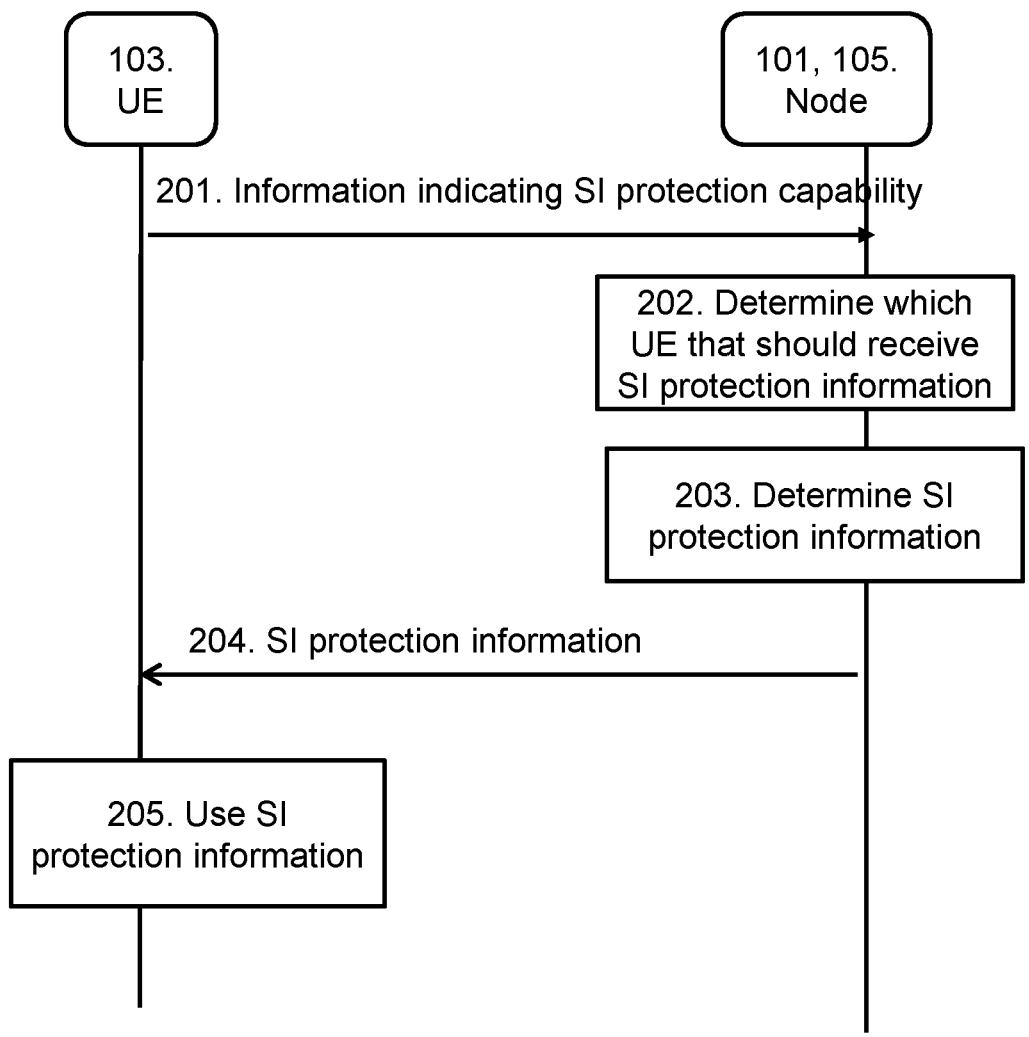
FIG. 2 is a signaling diagram illustrating an example of a method.

FIG. 2 is a signaling diagram illustrating a method. The method in FIG. 2 shows communication between the UE 103 and a node 101, 105 in a communications system 100. The node 101, 105 may be any of the network node 101 or the CN node 103 in FIG. 1. The node 101, 105 may also be referred to as a communication node, a network node or CN node. The node 101, 105 is illustrated with a dotted box in FIG. 1. The communications system 100 may be a 2G network, a 3G network, a 4G network, a 5G network, a 6G network or any other legacy, current of future network. The method in FIG. 2 comprises at least one of the following steps, which steps may be performed in any suitable order than described below:

Step 201

The UE 103 provides information indicating its SI protection capability to the node 101, 105. The node 101, 105 obtains information indicating the SI protection capability from the UE 103. The SI protection capability is associated with the UE's 103 capability and need to verify SI signatures.

When the node 101, 105 is a network node 101, then the information may be provided from the UE 103 to the network node 101 directly or via the CN node 105. When the node 101, 105 is a CN node 105, then the information may be provided from the UE 103 directly to the CN node 105 or via some other CN node 105.

The node 101, 105 to which the SI protection capability is provided may be the same or different node compared the node 101, 105 from which the SI protection information is obtained.

The information may be provided directly from the UE 103 to the node 101, 105, via some other node, via a memory storage etc.

The SI protection capability indicates that the UE 103 is capable of verifying SI signatures. Some examples of the SI protection capability will be given in more detail below, see e.g. step 302.

The term SI capability may be used in short herein when referring to the SI protection capability.

The information indicating the SI protection capability may be comprised in a NAS message or a RRC message.

The SI protection capability may indicate at least one of:
  a) whether or not the UE 103 supports SI signature verification; and/or
  b) whether or not the UE 103 supports clock or time information in SI signature calculation; and/or
  c) whether or not the UE 103 supports geographical location information in SI signature calculation; and/or
  d) which cryptographic primitives of signature schemes does the UE 103 support; and/or
  e) which SI messages that are time critical; and/or
  f) which SI messages the UE 103 needs to use only if correctly verified; and/or
  g) any combination of a)-f)

Step 202

The node 101, 105 determines which UE 103 that should receive the SI protection information. There may be multiple candidate UEs 103 that could receive the SI protection information. The node 101, 105 may determine that all, some or only one of the multiple UEs 103 should receive the SI protection information. For example, the node 101, 105 may determine that the UEs 103 which has provided information indicating their SI protection capability may receive the SI protection information. In another example, the node 101, 105 may determine that the UEs 103 which has provided information indicating their SI protection capability and where this SI protection capability fulfills at least one criterion may receive the SI protection information. Thus, the decision in step 202 may be based on the information from step 201.

Step 203

The node 101, 105 may determine the SI protection information. More details regarding the content of the SI protection information will be provided in more detail below, see e.g. steps 302 and 303.

The SI protection information may comprise at least one of:
   a) cells for which the SI shall have the SI signature; and/or
   b) SI numbers which shall be covered by the SI signature, e.g. a subset of SI; and/or
   c) a public key corresponding to a private key used for SI signature generation; and/or
   d) any combination of a)-c).

If the verification of SI signature fails, there may be a need to be aware of behaviour regarding what the UE 103 should do next. One behaviour may be to leave it up to the implementations, meaning that each UE vendor may decide how their UEs 103 behave. However, all UE vendors may not have same level of quality control or expertise. Another behaviour may be to have one standardized behaviour for all UEs 103, e.g., do cell reselection. Doing so may not be future proof because better ways of handling such situations may evolve in future. Therefore, the node 101, 105 may indicate to the UE 103 what the UE 103 should do when the SI signature fails. The indication may be a part of SI protection information.

Note that step 202 may be performed before or after step 203, or these two steps may be performed in parallel.

Step 204

The node 101, 105 provides the SI protection information to the UE 103, i.e. the SI protection information which was determined in step 203. The UE 103 obtains the SI protection information from the node 101, 105, e.g. by broadcasting.

When the node 101, 105 is a network node 101, then the information may be obtained from the UE 103 to the network node 101 directly or via the CN node 105. When the node 101, 105 is a CN node 105, then the information may be obtained from the UE 103 directly to the CN node 105 or via some other CN node 105.

The information may be obtained directly from the node 101, 105 to the UE 103, via some other node, via a memory storage etc.

Step 205

The UE 103 uses the SI protection information, e.g. it verifies future received SI signatures. Using the SI protection information may comprise verifying SI signatures.

Figure 3:
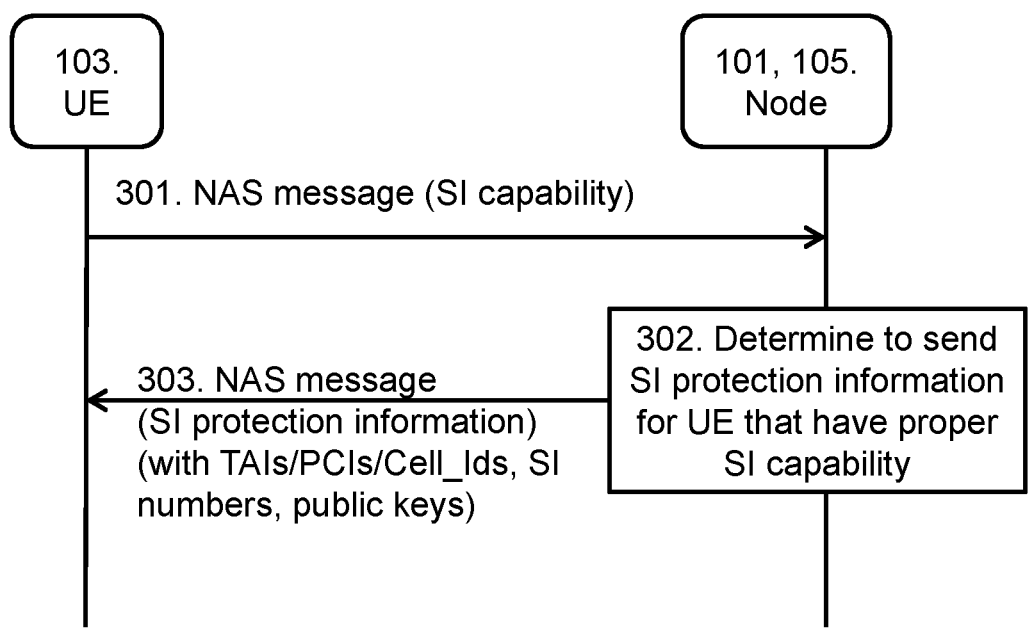
FIG. 3 is a signaling diagram illustrating an example of a method.

FIG. 3 is a signaling diagram illustrating a method. The method in FIG. 3 shows communication between the UE 103 and a node 101, 105. The node 101, 105 may be any of the network node 101 or the CN node 105 in FIG. 1. The node 101, 105 may also be referred to as a communication node, a network node or CN node. The method in FIG. 3 comprises at least one of the following steps, which steps may be performed in any suitable order than described below:

Step 301

This step corresponds to step 201 in FIG. 2.

The UE 103 provides information indicating its capability to verify SI signatures to the node 101, 105. The information may be provided in any suitable message such as for example a Non-Access Stratum (NAS) message or a RRC message. In case the node 101, 105 is a CN node 105, then the role of CN node 105, here, may be taken by a network function like AMF. The role of the NAS message, here, may be taken by message like Registration Request and the capability could be indicated as part of the UE security capability information element in this message. The provided information may also be referred to as SI capability information, SI capability etc.

The information indicating the capability may comprise at least one of the information such as below:
   a) Whether or not the UE 103 supports SI digital signature verification, like a Boolean value.
   b) Whether or not the UE 103 supports clock or time calculation and further details. This is useful information to the node 101, 105 to decide, for example to include time as input to digital signature calculation.
   c) Whether or not the UE 103 supports geographical location calculation and further details. This may be useful information to the node 101, 105 to decide, for example to include GPS information as input to digital signature calculation.
   d) Which cryptographic primitives of signature schemes the UE 103 supports. For example a list of schemes such as Elliptic Curve Digital Signature Algorithm (ECDSA) and Elliptic Curve-based Certificateless Signatures for Identity-based Encryption (ECCSI). Domain parameters of ECDSA and ECCSI may also be comprised in the information indicating the capability.
   e) Which SI messages the UE 103 needs to use quickly, such as a list of SI messages—MIB, SIB1, SIB9, etc. SI messages that the UE 103 needs to use quickly may be described as being time critical, i.e. that they may need to be used by the UE 103 within a time period. In this way, the UE 103 may indicate appropriate information that is required for the UE's use cases. E.g. if the UE 103 is an IoT device keeping track of time, then it needs to read SIB9 quickly.
   f) Which SI messages the UE 103 needs to use only if correctly verified, such as a list of SI messages—MIB, SIB1, SIB9, etc. In this way, the UE 103 may indicate appropriate information that is required for the UE's use cases. E.g. if the UE 103 is an IoT device keeping track of time, then it needs to read SIB9 only if that SIB9 has a valid digital signature.

Step 302

This step corresponds to step 202 and step 203 in FIG. 2. The node 101, 105 uses the UE's capability from step 301 to decide whether or not to provide SI protection information to the UE 103.

The node 101, 105 may determine which UE 103 of a plurality of UEs that should be provided with the SI protection information. The node 101, 105 may determine that the UE 103 in the plurality that has at least one SI capability that fulfills at least one criteria should be provided with the SI protection information.

The node 101, 105 may determine which SI protection information that it should provide to the UE 103. For example, the node 101, 105 may decide to provide a stripped down version of the SI protection information to the UE 103. Where "stripped down version" is a version of the SI protection information that comprises only a part of the SI protection information, e.g. a part which has been determined by the node 101, 105 to be of a certain relevance or priority for the UE 103.

The node 101, 105 may decide to provide different versions of SI protection information to the UE 103. For example, the node 101, 105 may decide to provide ECCSI to one type of UE 103 and ECDSA to another type of UEs 103. ECCSI may be a first version of the SI protection information and ECDSA may be a second version of the SI protection information. In case there are multiple UEs 103 that receive the SI protection information, then a first UE type may receive a first version of the SI protection information and a second UE type may receive a second version of the SI protection information. Or, a first UE type may receive a first part of the SI protection information or a second UE type may receive a second part of the SI protection information.

The node 101, 105 may decide on different signature lengths for different UEs 103, where length may comprise a number of bits or bytes or similar.

Step 302 may comprise to determine the SI protection information. As described below in step 303, the SI protection information may be for cells for which the broadcast SI shall have signature, SI numbers which may be covered by the signature, public keys for signature verification etc.

If the verification of SI signature fails, there may be a need to be aware of behaviour regarding what the UE 103 should do next. One behaviour may be to leave it up to the implementations, meaning that each UE vendor may decide how their UEs 103 behave. However, all UE vendors may not have same level of quality control or expertise. Another behaviour may be to have one standardized behaviour for all UEs 103, e.g. do cell reselection. Doing so may not be future proof because better ways of handling such situations may evolve in future. Therefore, the node 101, 105 may indicate to the UE 103 what the UE 103 should do when the SI signature fails. The indication may be a part of SI protection information.

Step 303

This step corresponds to step 204 in FIG. 2. The node 101, 105 provides the SI protection information to the UE 103.

For some UEs 103, for example the ones with proper support, the node 101, 105 may provide the SI protection information, that the node 101, 105 determined in step 302, in a NAS message or a RRC message. The role of NAS message, here, may be taken by message like Registration Accept.

The SI protection information provided by the node 101, 105 to the UE 103 may be at least one or any combination of the following:
 a) Cells for which the broadcast SI shall have signature, e.g. Tracking Area Identities (TAI), Physical Layer Cell Identities (PCI), and Cell IDs, eNB ID, gNB ID.
 b) SI numbers which may be covered by the signature. For example, at least the minimal SI, i.e., MIB and SIB1, may be covered.
 c) Corresponding public keys for signature verification.

For item b), the SI numbers which may be covered by the signature may be seen as a subset of SI which may be covered by the SI signature.

If the verification of SI signature fails, there may be a need to be aware of behaviour regarding what the UE 103 should do next. One behaviour may be to leave it up to the implementations, meaning that each UE vendor may decide how their UEs 103 behave. However, all UE vendors may not have same level of quality control or expertise. Another behaviour may be to have one standardized behaviour for all UEs 103, e.g. do cell reselection. Doing so may not be future proof because better ways of handling such situations may evolve in future. Therefore, the node 101, 105 may indicate to the UE 103 what the UE 103 should do when SI signature fails. The indication may be a part of the SI protection information.

Note that the SI protection information may only be sent after NAS security activation.

For some UEs 103, for example the one without proper support, the node 101, 105 may skip providing the SI protection information, i.e. step 303 may not be performed for UEs 103 without proper support which are UEs 103 that have not indicated any SI capability in step 301.

Note that although the methods herein may in some place be described in the context of NR, the same methods may be applied to any access technologies that make use of SI like LTE or NB-IoT.

Figure 4A:
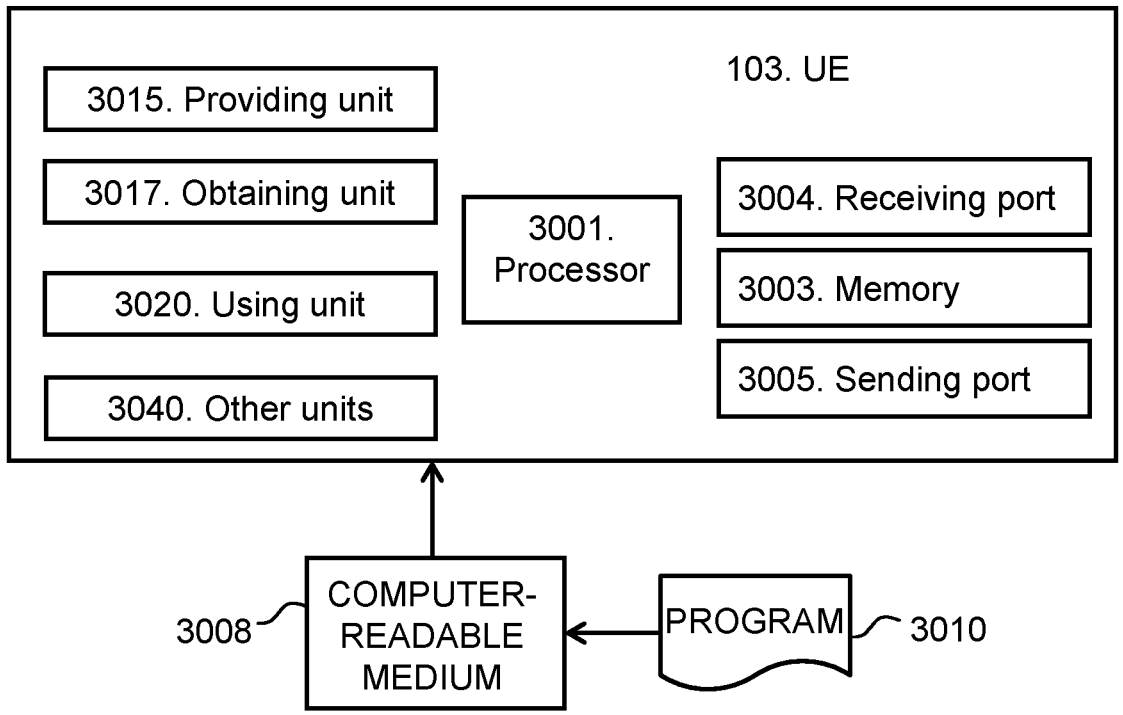
FIG. 4a-4b are schematic drawings illustrating an example of a UE.
Figure 4B:
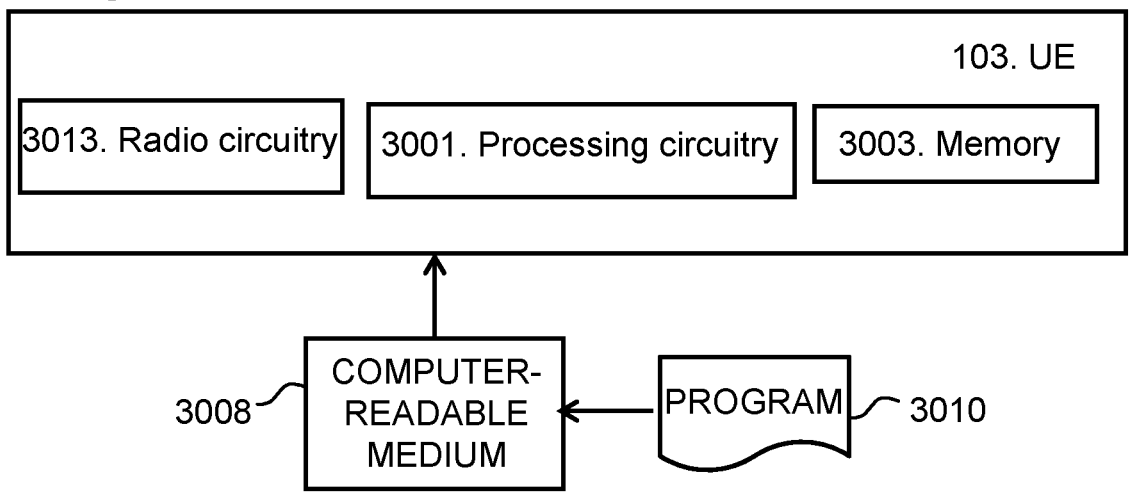

FIG. 4a and FIG. 4b depict two different examples in panels a) and b), respectively, of the arrangement that the UE 103 may comprise. The UE 103 may comprise the following arrangement depicted in FIG. 4a.

The embodiments herein in the UE 103 may be implemented through one or more processors, such as a processor 3001 in the UE 103 depicted in FIG. 4a, together with computer program code for performing the functions and actions described herein. A processor, as used herein, may be understood to be a hardware component. The program code mentioned above may also be provided as a computer program product, for instance in the form of a data carrier carrying computer program code for performing the embodiments herein when being loaded into the UE 103. One such carrier may be in the form of a CD ROM disc. It is however feasible with other data carriers such as a memory stick. The computer program code may furthermore be provided as pure program code on a server and downloaded to the UE 103.

The UE 103 may further comprise a memory 3003 comprising one or more memory units. The memory 3003 is arranged to be used to store obtained information, store data, configurations, schedulings, and applications etc. to perform the methods herein when being executed in the UE 103.

The UE 103 may receive information from, e.g., the node 101, 105, through a receiving port 304. The receiving port 3004 may be, for example, connected to one or more antennas in UE 103. The UE 103 may receive information from another structure in the communications system 100 through the receiving port 3004. Since the receiving port 3004 may be in communication with the processor 3001, the receiving port 3004 may then send the received information to the processor 3001. The receiving port 3004 may also be configured to receive other information.

The processor 3001 in the UE 103 may be further configured to transmit or send information to e.g. the first network node 101 or another structure in the communications system 100, through a sending port 3005, which may be in communication with the processor 3010, and the memory 3003.

The UE 103 may comprise a providing unit 3015, an obtaining unit 3017, a using unit 3020, other units 3040.

The UE 103 is adapted to, e.g. by means of the providing unit 3015, provide information indicating its SI protection capability to a node 101, 105. The SI protection capability is associated with the UE's 103 capability and need to verify SI signatures. The information indicating the SI protection capability may be comprised in a NAS message or a RRC message.

The SI protection capability may indicate at least one of:
a) whether or not the UE 103 supports SI signature verification; and/or
b) whether or not the UE 103 supports clock or time information in SI signature calculation; and/or
c) whether or not the UE 103 supports geographical location information in SI signature calculation; and/or
d) which cryptographic primitives of signature schemes does the UE 103 support; and/or
e) which SI messages that are time critical; and/or
f) which SI messages the UE 103 needs to use only if correctly verified; and/or
g) any combination of a)-f).

The UE 103 is adapted to, e.g. by means of the obtaining unit 3017, obtain SI protection information from the node 101, 105. The node 101, 105 to which the SI protection capability is provided may be the same or different node compared the node 101, 105 from which the SI protection information is obtained.

The SI protection information may comprise at least one of:
a) cells, e.g. TAI, PCI, cell IDs, eNB id, gNB id, for which the SI shall have the SI signature; and/or
b) SI numbers which shall be covered by the SI signature; and/or
c) a public key corresponding to a private key used for SI signature generation; and/or
d) Any combination of a)-c).

If the verification of SI signature fails, there may be a need to be aware of behaviour regarding what the UE 103 should do next. One behaviour may be to leave it up to the implementations, meaning that each UE vendor may decide how their UEs 103 behave. However, all UE vendors may not have same level of quality control or expertise. Another behaviour may be to have one standardized behaviour for all UEs 103, e.g., do cell reselection. Doing so may not be future proof because better ways of handling such situations may evolve in future. Therefore, the node 101, 105 may indicate to the UE 103 what the UE 103 should do when the SI signature fails. The indication may be a part of SI protection information.

The UE 103 is adapted to, e.g. by means of the using unit 3020, use the SI protection information. The UE 103 may be adapted to use the SI protection information by verifying SI signatures.

Those skilled in the art will also appreciate that the providing unit 3015, the obtaining unit 3017, the using unit 3020, and other units 3040 described above may refer to a combination of analog and digital circuits, and/or one or more processors configured with software and/or firmware, e.g. stored in memory, that, when executed by the one or more processors such as the processor 3001, perform as described above. One or more of these processors, as well as the other digital hardware, may be comprised in a single Application-Specific Integrated Circuit (ASIC), or several processors and various digital hardware may be distributed among several separate components, whether individually packaged or assembled into a System-on-a-Chip (SoC).

Also, in some embodiments, the different units 3015-3040 described above may be implemented as one or more applications running on one or more processors such as the processor 3001.

Thus, the methods described herein for the UE 103 may be respectively implemented by means of a computer program 3010 product, comprising instructions, i.e., software code portions, which, when executed on at least one processor 3001, cause the at least one processor 3001 to carry out the actions described herein, as performed by the UE 103. The computer program 3010 product may be stored on a computer-readable storage medium 3008. The computer-readable storage medium 3008, having stored thereon the computer program 3010, may comprise instructions which, when executed on at least one processor 3001, cause the at least one processor 3001 to carry out the actions described herein, as performed by the UE 103. The computer-readable storage medium 3008 may be a non-transitory computer-readable storage medium, such as a CD ROM disc, or a memory stick. The computer program 3010 product may be stored on a carrier comprising the computer program 3010 just described. The carrier is one of an electronic signal, optical signal, radio signal, or the computer-readable storage medium 508, as described above.

The UE 103 may comprise a communication interface configured to facilitate communications between the UE 103 and other nodes or devices, e.g., the network node 101 or another structure. The interface may, for example, comprise a transceiver configured to transmit and receive radio signals over an air interface in accordance with a suitable standard.

The UE 103 may comprise the following arrangement depicted in FIG. 4b. The UE 103 may comprise a processing circuitry 3011, e.g., one or more processors such as the processor 3001, in the UE 103 and the memory 3003. The UE 103 may also comprise a radio circuitry 3013, which may comprise e.g., the receiving port 3004 and the sending port 3005. The processing circuitry 3011 may be configured to, or operable to, perform the method actions according to FIG. 2 and/or FIG. 3, in a similar manner as that described in relation to FIG. 4a. The radio circuitry 3013 may be configured to set up and maintain at least a wireless connection with the UE 103. Circuitry may be understood herein as a hardware component.

Hence, embodiments herein also relate to the UE 103 operative to operate in the communications system 100. The UE 103 may comprise the processing circuitry 3011 and the memory 3003. The memory 3003 comprises instructions executable by the processing circuitry 3011. The UE 103 is further operative to perform the actions described herein in relation to the UE 103, e.g. in FIG. 2 and/or FIG. 3.

Figure 5A:
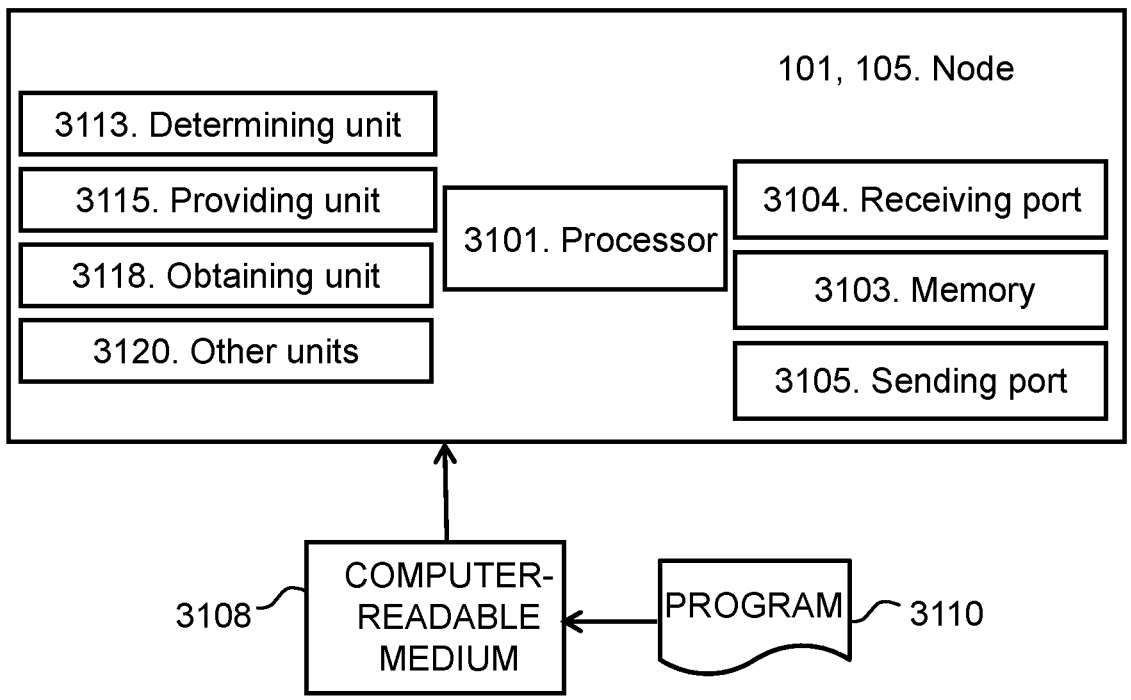
FIG. 5a-5b are schematic drawings illustrating an example of a node.
Figure 5B:
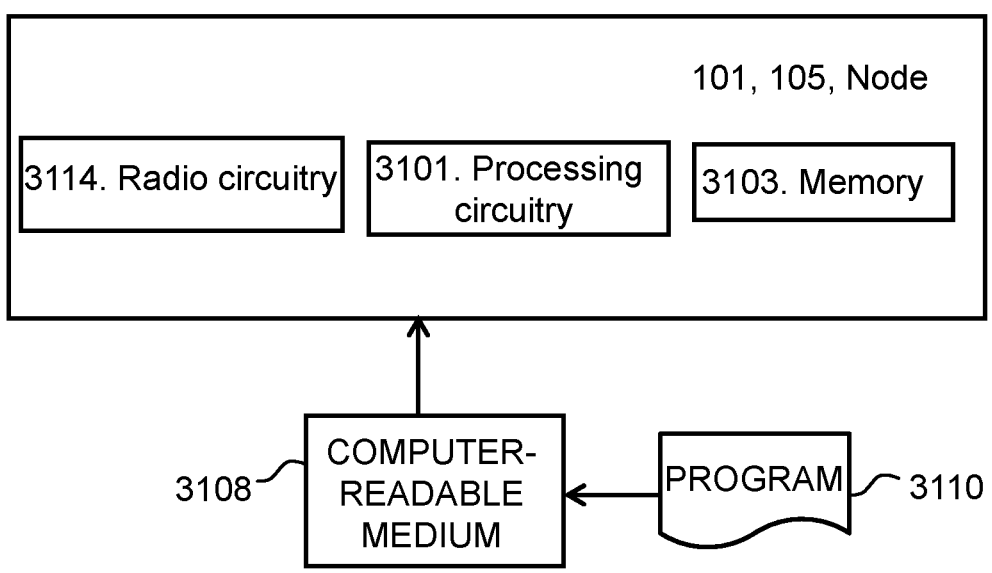

FIG. 5a and FIG. 5b depict two different examples in panels a) and b), respectively, of the arrangement that the node 101, 105 may comprise. The node 101, 105 may comprise the following arrangement depicted in FIG. 5a.

The embodiments herein in the node 101, 105 may be implemented through one or more processors, such as a processor 3101 in the network node 101, 105 depicted in FIG. 5a, together with computer program code for performing the functions and actions described herein. A processor, as used herein, may be understood to be a hardware component. The program code mentioned above may also be provided as a computer program product, for instance in the form of a data carrier carrying computer program code for performing the embodiments herein when being loaded into the node 101, 105. One such carrier may be in the form of a CD ROM disc. It is however feasible with other data carriers such as a memory stick. The computer program code may furthermore be provided as pure program code on a server and downloaded to the node 101,105.

The node 101, 105 may further comprise a memory 3103 comprising one or more memory units. The memory 3103 is arranged to be used to store obtained information, store data, configurations, schedulings, and applications etc. to perform the methods herein when being executed in the node 101, 105.

The node 101, 105 may receive information from, e.g. the UE 103 and/or another network node, through a receiving port 3104. The receiving port 3104 may be, for example, connected to one or more antennas in the node 101, 105. The node 101, 105 may receive information from another structure in the communications system 100 the receiving port 3104. Since the receiving port 3104 may be in communication with the processor 3101, the receiving port 3104 may then send the received information to the processor 3101. The receiving port 3104 may also be configured to receive other information.

The processor 3101 in the node 101, 105 may be further configured to transmit or send information to e.g. the UE 103, or another structure in the communications system 100, through a sending port 3105, which may be in communication with the processor 3101 and the memory 3103.

The node 101, 105 may comprise a determining unit 3113, a providing unit 3115, an obtaining unit 3118, other units 3020 etc.

The node 101, 105 is adapted to, e.g. by means of the obtaining unit 3118, obtain information indicating SI protection capability from a UE 103. The SI protection capability is associated with the UE's 103 capability and need to verify SI signatures.

The SI protection capability may indicate at least one of:
a) whether or not the UE 103 supports SI signature verification, the SI signature verification may be SI digital signature verification; and/or
b) whether or not the UE 103 supports clock or time information in SI signature calculation and further details; and/or
c) whether or not the UE 103 supports geographical location information in SI signature calculation and further details; and/or
d) which cryptographic primitives of signature schemes does the UE 103 support; and/or
e) which SI messages that are time critical, i.e. that needs to be used quickly by the UE 103; and/or
f) which SI messages the UE 103 needs to use only if correctly verified; and/or
g) any combination of a)-f).

The node 101, 105 is adapted to, e.g. by means of the determining unit 3113, determine SI protection information based on the information indicating SI protection capability. The SI protection information may comprise at least one of:
a) cells, e.g. TAI, PCI, cell IDs, eNB ID, gNB ID etc., for which the SI shall have the SI signature, the SI may be broadcasted; and/or
b) SI numbers which shall be covered by the SI signature; and/or
c) a public key corresponding to a private key used for SI signature generation, i.e. a corresponding public key for signature verification; and/or
d) any combination a)-c).

If the verification of SI signature fails, there may be a need to be aware of behaviour regarding what the UE 103 should do next. One behaviour may be to leave it up to the implementations, meaning that each UE vendor may decide how their UEs 103 behave. However, all UE vendors may not have same level of quality control or expertise. Another behaviour may be to have one standardized behaviour for all UEs 103, e.g., do cell reselection. Doing so may not be future proof because better ways of handling such situations may evolve in future. Therefore, the node 101, 105 may indicate to the UE 103 what the UE 103 should do when the SI signature fails. The indication may be a part of SI protection information.

The node 101, 105 is adapted to, e.g. by means of the providing unit 3115, provide the determined SI protection information to the UE 103. The SI protection information may be provided to the UE 103 after NAS security activation The node 101, 105 may be adapted to, e.g. by means of the determining unit 3113, determine which UE 103 of a plurality of UEs 103 that should be provided with the determined SI protection information. The determining may be done based on the information indicating the SI protection capability.

The node 101, 105 may be adapted to, e.g. by means of the determining unit 3113, determine that a part of the SI protection information should be provided to the UE 103.

The node 101, 105 may be adapted to, e.g. by means of the determining unit 3113, determine which version of the SI protection information that should be provided to the UE 103. Different versions of the SI protection information may be provided to different UEs 103.

The node 101, 105 may be adapted to, e.g. by means of the determining unit 3113, determine a signature length for the SI signature to be provided to the UE 103.

The node 101, 105 may be a radio network node 101 or a CN node 105.

The node 101, 105 may be adapted to, e.g. by means of the determining unit 3113, determine that SI protection information should not be provided to UEs 103 not providing the information indicating the SI protection capability nor to UEs 103 having information indicating the SI protection capability which does not fulfil a criteria.

The node 101, 105 may be adapted to, e.g. by means of the determining unit 3113, determine which UEs 103 of a plurality of UEs 103 that should not be provided with the information indicating the SI protection capability.

The communications system 100 may be a 2G network, a 3G network, a 4G network, a 5G network, a 6G network or any other legacy, current of future network.

The node 101, 105 may be network node 101 such as e.g. a base station, node B, eNB, gNB, RNC etc, or a CN node 105 as exemplified above.

Those skilled in the art will also appreciate that the determining unit 3113, the providing unit 3115, the obtaining unit 3118, the other units 3020 etc. described above may refer to a combination of analog and digital circuits, and/or one or more processors configured with software and/or firmware, e.g., stored in memory, that, when executed by the one or more processors such as the processor 3101, perform as described above. One or more of these processors, as well as the other digital hardware, may be comprised in a single ASIC, or several processors and various digital hardware may be distributed among several separate components, whether individually packaged or assembled into a SoC.

Also, the different units 3113-3020 described above may be implemented as one or more applications running on one or more processors such as the processor 3101.

Thus, the methods described herein for the node 101, 105 may be respectively implemented by means of a computer program 3110 product, comprising instructions, i.e., software code portions, which, when executed on at least one processor 3101, cause the at least one processor 3101 to carry out the actions described herein, as performed by the node 101, 105. The computer program 3110 product may be stored on a computer-readable storage medium 3108. The computer-readable storage medium 3108, having stored thereon the computer program 3110, may comprise instructions which, when executed on at least one processor 3101, cause the at least one processor 3101 to carry out the actions described herein, as performed by the node 101, 105. The computer-readable storage medium 3110 may be a non-transitory computer-readable storage medium, such as a CD ROM disc, or a memory stick. The computer program 3110 product may be stored on a carrier comprising the computer program 3110 just described. The carrier is one of an electronic signal, optical signal, radio signal, or the computer-readable storage medium 3108, as described above.

The node 101, 105 may comprise a communication interface configured to facilitate communications between the node 101, 105 and other nodes or devices, e.g., the UE 103, or another structure. The interface may, for example, comprise a transceiver configured to transmit and receive radio signals over an air interface in accordance with a suitable standard.

The node 101, 105 may comprise the following arrangement depicted in FIG. 5b. The node 101, 105 may comprise a processing circuitry 3111, e.g., one or more processors such as the processor 3101, in the node 101, 105 and the memory 3103. The node 101, 105 may also comprise a radio circuitry 3114, which may comprise e.g., the receiving port 3104 and the second sending port 3105. The processing circuitry 3111 may be configured to, or operable to, perform the method actions according to FIG. 2 and/or FIG. 3 in a similar manner as that described in relation to FIG. 5a. The radio circuitry 3114 may be configured to set up and maintain at least a wireless connection with the node 101, 105. Circuitry may be understood herein as a hardware component.

Hence, embodiments herein also relate to the node 101, 105 to operate in the communications system 100. The node 101, 105 may comprise the processing circuitry 3111 and the memory 3103. The memory 3103 comprises instructions executable by said processing circuitry 3111. The node 101, 105 is further operative to perform the actions described herein in relation to the network node 101, e.g., FIG. 2 and/or FIG. 3.

Further Extensions and Variations

Telecommunication network connected via an intermediate network to a host computer in accordance with some embodiments.

Figure 6:
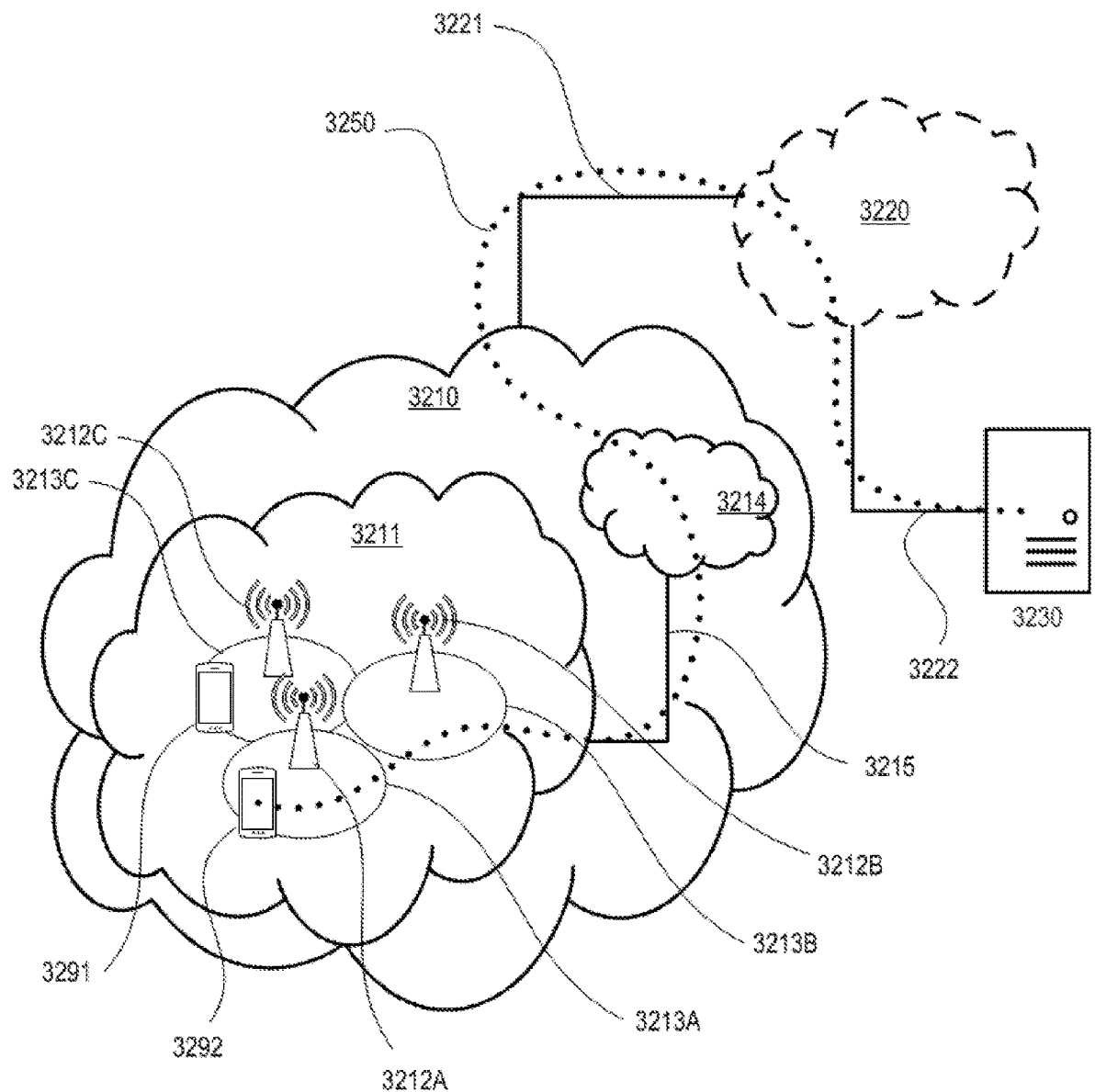
FIG. 6 is a schematic block diagram illustrating a telecommunication network connected via an intermediate network to a host computer.

With reference to FIG. 6, a communications system 100 comprises a telecommunication network 3210 such as the communications system 100, for example, a 3GPP-type cellular network, which comprises an access network 3211, such as a radio access network, and a core network 3214. The access network 3211 comprises a plurality of network nodes 101. For example, base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A plurality of UEs, such as the UE 103 may be comprised in the communications system 100. In FIG. 6, a first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212. Any of the UEs 3291, 3292 may be considered examples of the UE 103.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. Connections 3221 and 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network. The intermediate network 3220, if any, may be a backbone network or the Internet, In particular, the intermediate network 3220 may comprise two or more sub-networks (not shown).

The communication system of FIG. 6 as a whole enables connectivity between the connected UEs 3291, 3292 and the host computer 3230. The connectivity may be described as an Over-The-Top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, the base station 3212 may not or need not be informed about the past routing of an incoming downlink communication with data originating from the host computer 3230 to be forwarded (e.g., handed over) to a connected UE 3291. Similarly, the base station 3212 need not be aware of the future routing of an outgoing uplink communication originating from the UE 3291 towards the host computer 3230.

In relation to FIGS. 7-11 which are described next, it may be understood that the base station may be considered an example of the node 101, 105.

Figure 7:
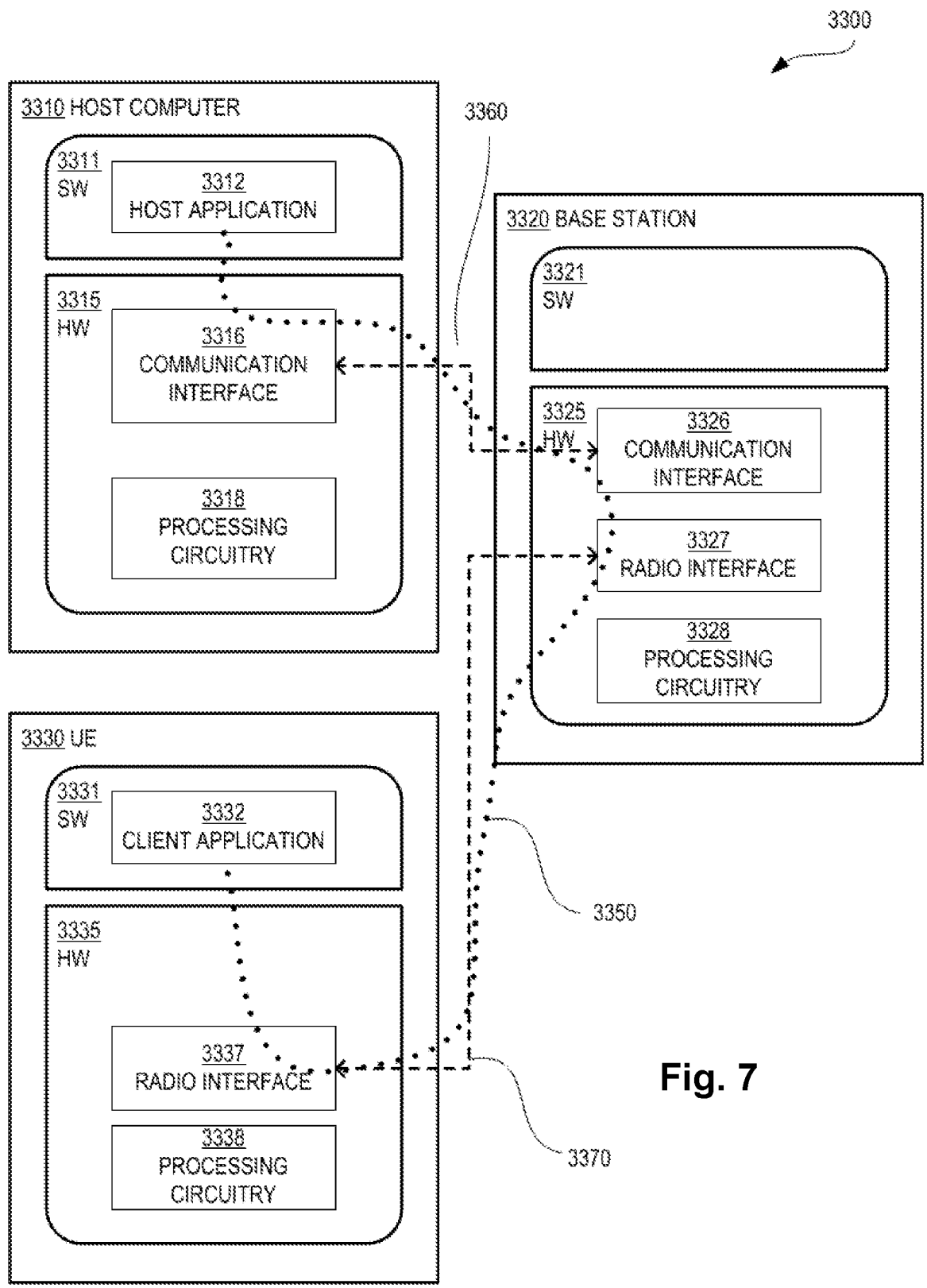
FIG. 7 is a schematic block diagram of a host computer communicating via a base station with a UE over a partially wireless connection.

FIG. 7 illustrates an example of a host computer communicating via a base station 101 with a UE 103 over a partially wireless connection.

The UE 103 and the network node 101, 105, e.g., a base station and a host computer discussed in the preceding paragraphs will now be described with reference to FIG. 7. In the communication system 3330, such as the communications system 100, the host computer 3310 comprises hardware 3315 comprising a communication interface 3316 configured to set up and maintain a wired or wireless connection with an interface of a different communication device of the communication system 3300. The host computer 3310 further comprises the processing circuitry 3318, which may have storage and/or processing capabilities. In particular, the processing circuitry 3318 may comprise one or more programmable processors, ASICS, field programmable gate arrays (FPGA) or combinations of these (not shown) adapted to execute instructions. The host computer 3310 further comprises software 3311, which is stored in or accessible by the host computer 3310 and executable by the processing circuitry 3318. The software 3311 comprises a host application 3312. The host application 3312 may be operable to provide a service to a remote user, such as UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further comprises the node 101, 105 exemplified in FIG. 7 as a base station 3320 provided in a telecommunication system and comprising hardware 3325 enabling it to communicate with the host computer 3310 and with the UE 3330. The hardware 3325 may comprise a communication interface 3326 for setting up and maintaining a wired or wireless connection with an interface of a different communication device of the communication system 3300, as well as a radio interface 3327 for setting up and maintaining at least a wireless connection 3370 with the UE 103, exemplified in FIG. 7 as a UE 3330 located in a coverage area (not shown in FIG. 7) served by the base station 3320. The communication interface 3326 may be configured to facilitate a connection 3360 to the host computer 3310. The connection 3360 may be direct or it may pass through a core network (not shown in FIG. 7) of the telecommunication system and/or through one or more intermediate networks outside the telecommunication system. In the embodiment shown, the hardware 3325 of the base station 3320 further comprises a processing circuitry 3328, which may comprise one or more programmable processors, ASICs, FPGAs or combinations of these (not shown) adapted to execute instructions. The base station 3320 further has software 3321 stored internally or accessible via an external connection.

The communication system 3300 further comprises a UE 3330 already referred to. It's hardware 3335 may comprise a radio interface 3337 configured to set up and maintain the wireless connection 3370 with a base station serving a coverage area in which the UE 3330 is currently located. The hardware 3335 of the UE 3330 further comprises a processing circuitry 3338, which may comprise one or more programmable processors, ASICs, FPGAs or combinations of these (not shown) adapted to execute instructions. The UE 3330 further comprises software 3331, which is stored in or accessible by the UE 3330 and executable by the processing circuitry 3338. The software 3331 comprises a client application 3332. The client application 3332 may be operable to provide a service to a human or non-human user via the UE 3330, with the support of the host computer 3310. In the host computer 3310, an executing host application 3312 may communicate with the executing client application 3332 via an OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, the base station 3320 and the UE 3330 illustrated in FIG. 7 may be similar or identical to the host computer 3230, one of the base stations 3212a, 3212b, 3212c and one of the UEs 3291, 3292 of FIG. 6, respectively. This is to say, the inner workings of these entities may be as shown in FIG. 7 and independently, the surrounding network topology may be that of FIG. 6.

In FIG. 7, the OTT connection 3350 has been drawn abstractly to illustrate the communication between the host computer 3310 and the UE 3330 via the base station 3320, without explicit reference to any intermediary devices and the precise routing of messages via these devices. The network infrastructure may determine the routing, which it may be configured to hide from the UE 3330 or from the service provider operating the host computer 3310, or both. While the OTT connection 3350 is active, the network infrastructure may further take decisions by which it dynamically changes the routing, e.g., on the basis of load balancing consideration or reconfiguration of the network.

The wireless connection 3370 between the UE 3330 and the base station 3320 is in accordance with the teachings described throughout this disclosure. One or more of the various embodiments improve the performance of OTT services provided to UE 3330 using the OTT connection 3350, in which the wireless connection 3370 forms the last segment. More precisely, the teachings of these embodiments may improve the spectrum efficiency, and latency, and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and the UE 3330, in response to variations in the measurement results. The measurement procedure and/or the network functionality for reconfiguring the OTT connection 3350 may be implemented in the software 3311 and the hardware 3315 of the host computer 3310 or in the software 3331 and the hardware 3335 of the UE 3330, or both. Sensors (not shown) may be deployed in or in association with communication devices through which the OTT connection 3350 passes. The sensors may participate in the measurement procedure by supplying values of the monitored quantities exemplified above, or supplying values of other physical quantities from which the software 3311, 3331 may compute or estimate the monitored quantities. The reconfiguring of the OTT connection 3350 may comprise information indicating message format, retransmission settings, preferred routing etc. The reconfiguring need not affect the base station 3320, and it may be unknown or imperceptible to the base station 3320. Such procedures and functionalities may be known and practiced in the art. Measurements may involve proprietary UE signaling facilitating the host computer 3310's measurements of throughput, propagation times, latency and the like. The measurements may be implemented in the software 3311 and causes messages to be transmitted, in particular empty or 'dummy' messages, using the OTT connection 3350 while it monitors propagation times, errors etc.

Figures 8, 9:
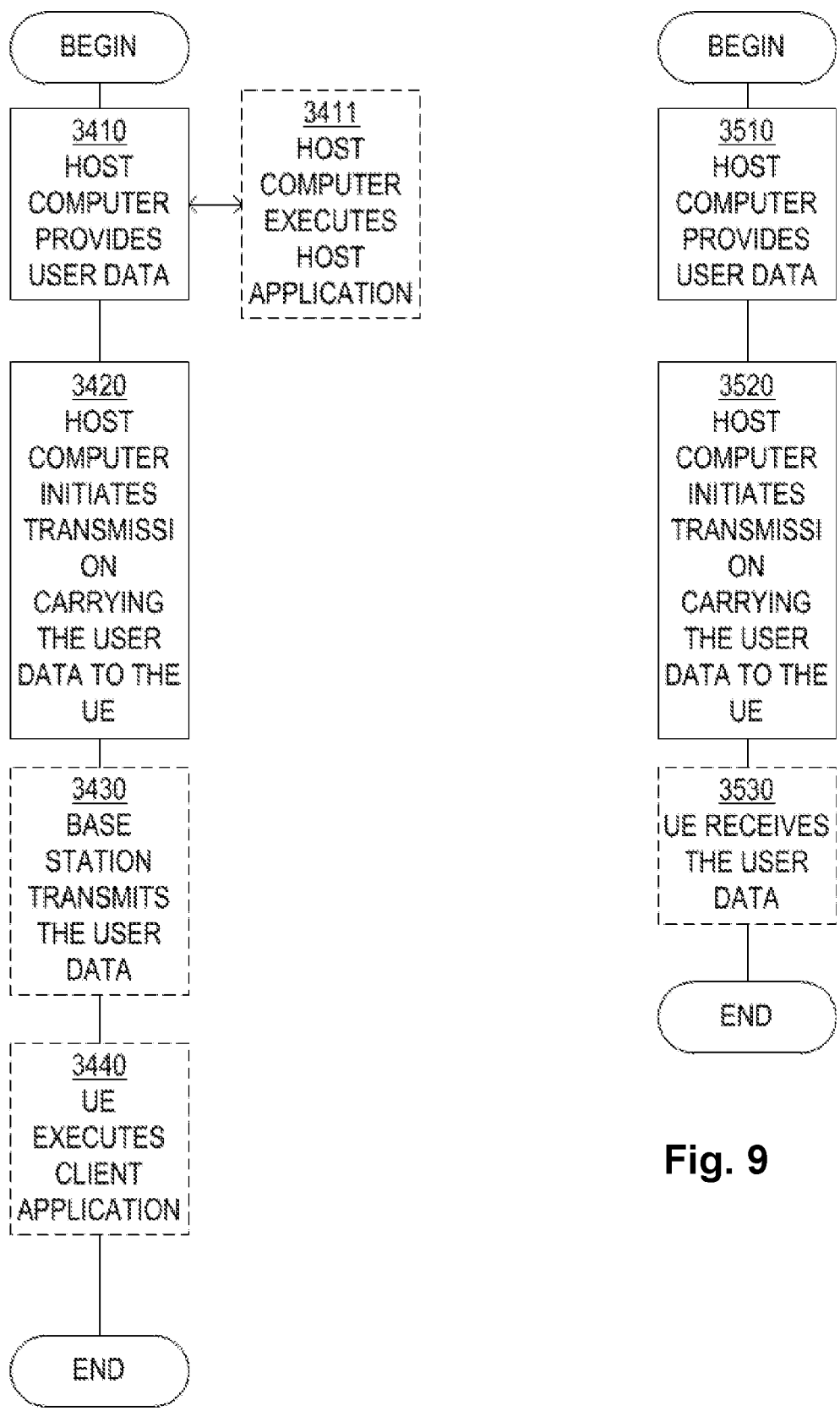
FIG. 8 is a flowchart depicting embodiments of a method in a communications system comprising a host computer, a base station and a UE.
FIG. 9 is a comprising depicting embodiments of a method in a communications system comprising a host computer, a base station and a UE.

FIG. 8 illustrates methods implemented in a communications system 100 comprising a host computer, a base station and a UE. FIG. 8 is a flowchart illustrating a method implemented in the communications system 100. The communications system 100 comprises a host computer, a base station and a UE which may be those described with reference to FIG. 6 and FIG. 7. For simplicity of the present disclosure, only drawing references to FIG. 8 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits, to the UE, the user data which was carried in the transmission that the host computer initiated. In step 3440 (which may also be optional), the UE executes a client application associated with the host application executed by the host computer.

FIG. 9 illustrates methods implemented in a communications system 100 comprising a host computer, a base station and a UE. FIG. 9 is a flowchart illustrating a method implemented in a communications system 100. The communications system 100 comprises a host computer, a base station and a UE which may be those described with reference to FIG. 6 and FIG. 7. In step 3510 of the method, the host computer provides user data. In an optional substep (not shown) the host computer provides the user data by executing a host application. In step 3520, the host computer initiates a transmission carrying the user data to the UE. The transmission may pass via the base station. In step 3530 (which may be optional), the UE receives the user data carried in the transmission.

FIG. 10 illustrates methods implemented in a communications system 100 comprising a host computer, a base station and UE. FIG. 10 is a flowchart illustrating a method implemented in a communications system 100. The communications system 100 comprises a host computer, a base station 101 and a UE 103 which may be those described with reference to FIG. 6 and FIG. 7. For simplicity of the present disclosure, only drawing references to FIG. 10 will be included in this section. In step 3610 (which may be optional), the UE 103 receives input data provided by the host computer. Additionally or alternatively, in step 3620, the UE 103 provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE.

FIG. 11 illustrates methods implemented in a communications system 100 comprising a host computer, a base station and a UE. FIG. 11 is a flowchart illustrating a method implemented in a communications system 100. The communications system 100 comprises a host computer, a base station and a UE which may be those described with reference to FIG. 6 and FIG. 7. In step 3710 (which may be optional), the base station receives user data from the UE. In step 3720 (which may be optional), the base station initiates transmission of the received user data to the host computer. In step 3730 (which may be optional), the host computer receives the user data carried in the transmission initiated by the base station.

Some embodiments may be summarized as follows:

A base station may be configured to communicate with a UE 103. The base station comprises a radio interface and a processing circuitry configured to perform one or more of the actions described herein as performed by the node 101, 105.

A communications system 100 comprises a host computer comprising:
  a processing circuitry configured to provide user data; and
  a communication interface configured to forward the user data to a cellular network for transmission to a UE 103,
The cellular network comprises a base station 101 having a radio interface and processing circuitry. The base station's processing circuitry is configured to perform one or more of the actions described herein as performed by the network node 101.

The communications system 100 may further comprise the base station 101.

The communications system 100 may further comprise the UE 103. The UE 103 is configured to communicate with the base station 101.

The communications system 100, wherein:
  the processing circuitry of the host computer is configured to execute a host application, thereby providing the user data; and
  the UE 103 comprises a processing circuitry configured to execute a client application associated with the host application.

A method implemented in a base station 101 comprises one or more of the actions described herein as performed by the node 101, 105.

A method implemented in a communications system 100 comprises a host computer, a base station and a UE 103. The method comprises:
  at the host computer, providing user data; and
  at the host computer, initiating a transmission carrying the user data to the UE 103 via a cellular network comprising the base station 101. The base station 101 performs one or more of the actions described herein as performed by the network node 101.

The method may further comprise:
  at the base station 101, transmitting the user data.

The user data may be provided at the host computer by executing a host application, and the method may further comprise:
  at the UE 103, executing a client application associated with the host application.

A UE 103 configured to communicate with a base station 101. The UE 103 comprises a radio interface and a processing circuitry configured to perform one or more of the actions described herein as performed by the UE 103.

A communications system 100 comprises a host computer comprising:
  processing circuitry configured to provide user data; and
  a communication interface configured to forward user data to a cellular network for transmission to a UE 103,
The UE comprises a radio interface and processing circuitry. The UE's processing circuitry is configured to perform one or more of the actions described herein as performed by the UE 103.

The communications system 100 may further comprise the UE 103.

The communications system 100 further comprises a base station 101 configured to communicate with the UE 103.

The communications system 100, wherein:
  the processing circuitry of the host computer is configured to execute a host application, thereby providing the user data; and
  the UE's processing circuitry is configured to execute a client application associated with the host application.

A method implemented in a UE 103 comprising one or more of the actions described herein as performed by the UE 103.

A method implemented in a communications system 100 comprising a host computer, a base station 101 and a UE 103. The method comprises:
  at the host computer, providing user data; and
  at the host computer, initiating a transmission carrying the user data to the UE 103 via a cellular network comprising the base station. The UE 103 performs one or more of the actions described herein as performed by the UE 103.

The method may further comprise:
  at the UE 103, receiving the user data from the base station 101.

A UE 103 configured to communicate with a base station 101. The UE 103 comprises a radio interface and processing circuitry configured to perform one or more of the actions described herein as performed by the UE 103.

A communications system 100 comprises a host computer comprising:
a communication interface configured to receive user data originating from a transmission from a UE 103 to a base station 101,
The UE 103 comprises a radio interface and processing circuitry. The UE's processing circuitry is configured to perform one or more of the actions described herein as performed by the UE 103.

The communications system 100 may further comprise the UE 103.

The communications system 100 may further comprise the base station 101. The base station 101 comprises a radio interface configured to communicate with the UE 103 and a communication interface configured to forward to the host computer the user data carried by a transmission from the UE 103 to the base station.

The communications system 100, wherein:
the processing circuitry of the host computer is configured to execute a host application; and
the UE's processing circuitry is configured to execute a client application associated with the host application, thereby providing the user data.

The communications system 100, wherein:
the processing circuitry of the host computer is configured to execute a host application, thereby providing request data; and
the UE's processing circuitry is configured to execute a client application associated with the host application, thereby providing the user data in response to the request data.

A method implemented in a UE 103 comprising one or more of the actions described herein as performed by the UE 103.

The method may further comprise:
providing user data; and
forwarding the user data to a host computer via the transmission to the base station 101.

A method implemented in a communications system 100 comprises a host computer, a base station 101 and a UE 103. The method comprises:
at the host computer, receiving user data transmitted to the base station 101 from the UE 103. The UE 103 performs one or more of the actions described herein as performed by the UE 103.

The method may further comprise:
at the UE 103, providing the user data to the base station 101.

The method may further comprise:
at the UE 103, executing a client application, thereby providing the user data to be transmitted; and
at the host computer, executing a host application associated with the client application.

The method may further comprise:
at the UE 103, executing a client application; and
at the UE 103, receiving input data to the client application, the input data being provided at the host computer by executing a host application associated with the client application,
the user data to be transmitted is provided by the client application in response to the input data.

A base station 101 is configured to communicate with a UE 103. The base station 101 comprises a radio interface and a processing circuitry configured to perform one or more of the actions described herein as performed by the network node 101.

A communications system 100 comprises a host computer comprising a communication interface configured to receive user data originating from a transmission from a UE 103 to a base station. The base station 101 comprises a radio interface and a processing circuitry. The base station's processing circuitry is configured to perform one or more of the actions described herein as performed by the network node 101.

The communications system 100 may further comprise the base station 101.

The communications system 100 may further comprise the UE 103. The UE 103 is configured to communicate with the base station 101.

The communications system 100 wherein:
the processing circuitry of the host computer is configured to execute a host application;
the UE 103 is configured to execute a client application associated with the host application, thereby providing the user data to be received by the host computer.

A method implemented in a base station 101, comprises one or more of the actions described herein as performed by any of the network node 101.

A method implemented in a communications system 100 comprises a host computer, a base station 101 and a UE 103. The method comprises:
at the host computer, receiving, from the base station 101, user data originating from a transmission which the base station has received from the UE 103. The UE 103 performs one or more of the actions described herein as performed by the UE 103.

The method may further comprise:
at the base station 101, receive the user data from the UE 103.

The method may further comprise:
at the base station 101, initiate a transmission of the received user data to the host computer.

The communications system 100 may be a 2G network, a 3G network, a 4G network, a 5G network, a 6G network or any other legacy, current of future network.

The network node 101 may be a base station, node B, eNB, gNB, RNC etc.

The embodiments herein relate to that the UE 103 provides information indicating its SI protection capability to the node 101, 105.

The node 101, 105 uses the SI protection capability of the UE to decide whether or not to provide SI protection information to the UE 103. The node 101, 105 may provide stripped down SI protection information. The node 101, 105 may provide different versions of SI protection information to different UEs 103 with different SI protection capabilities.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step.

Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description. In general, the usage of "first", "second", "third", "fourth", and/or "fifth" herein may be understood to be an arbitrary way to denote different elements or entities, and may be understood to not confer a cumulative or chronological character to the nouns they modify, unless otherwise noted, based on context.

It should be noted that the examples herein are not mutually exclusive. Components from one embodiment may be tacitly assumed to be present in another embodiment and it will be obvious to a person skilled in the art how those components may be used in the other exemplary embodiments The embodiments herein are not limited to the above described embodiments. Various alternatives, modifications and equivalents may be used. Therefore, the above embodiments should not be taken as limiting the scope of the embodiments. A feature from one embodiment may be combined with one or more features of any other embodiment.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods may, without departing from the embodiments herein, be performed in another order than the order in which they appear herein.

The invention claimed is:

1. A method performed by a User Equipment (UE) in a communications system, the method comprising:
   providing information indicating the UE's System Information (SI) protection capability to a node, wherein the SI protection capability is associated with the UE's capability to verify SI signatures and need to verify SI signatures;
   obtaining SI protection information from the node; and
   using the SI protection information, wherein the using the SI protection information comprises verifying SI signatures.

2. The method of claim 1, wherein the information indicating the SI protection capability is comprised in a Non-Access Stratum (NAS) message or a Radio Resource Control (RRC) message.

3. The method of claim 1, wherein the information indicating the SI protection capability indicates at least one of:
   whether or not the UE supports SI signature verification; and/or
   whether or not the UE supports clock or time information in SI signature calculation; and/or
   whether or not the UE supports geographical location information in SI signature calculation; and/or
   which cryptographic primitives of signature schemes the UE supports; and/or
   which SI messages are time critical; and/or
   which SI messages the UE needs to use only if correctly verified.

4. The method of claim 1, wherein the SI protection information comprises at least one of:
   cells for which the SI shall have the SI signature; and/or
   a subset of SI which shall be covered by the SI signature; and/or
   a public key for SI signature verification.

5. A User Equipment (UE) for use in a communications system, wherein the UE comprises radio circuitry and processing circuitry operatively coupled to the radio circuitry, wherein the processing circuitry is configured to:
   provide information indicating its System Information (SI) protection capability to a node, wherein the SI protection capability is associated with the UE's capability to verify SI signatures and need to verify SI signatures;
   obtain SI protection information from the node; and to
   use the SI protection information by verifying SI signatures.

6. A method performed by a node in a communications system, the method comprising:
   obtaining information indicating System Information (SI) protection capability from a User Equipment (UE), wherein the SI protection capability is associated with the UE's capability to verify SI signatures and need to verify SI signatures;
   determining SI protection information based on the information indicating SI protection capability; and
   providing the determined SI protection information to the UE.

7. The method of claim 6, comprising:
   determining which UE of a plurality of UEs that should be provided with the determined SI protection information, wherein the determining is done based on the obtained information indicating the SI protection capability.

8. The method of claim 6, wherein the determining SI protection information comprises:
   determining that a part of the SI protection information should be provided to the UE.

9. The method of claim 6, wherein the determining SI protection information comprises:
   determining which version of the SI protection information that should be provided to the UE, wherein different versions of the SI protection information are provided to different UEs.

10. The method of claim 6, wherein the determining SI protection information comprises:
    determining a signature length for the SI to be provided to the UE.

11. The method of claim 6, wherein the information indicating the SI protection capability indicates at least one of:
    whether or not the UE supports SI signature verification; and/or
    whether or not the UE supports clock or time information in SI signature calculation; and/or
    whether or not the UE supports geographical location information in SI signature calculation; and/or
    which cryptographic primitives of signature schemes does the UE support; and/or
    which SI messages are time critical; and/or which SI messages the UE needs to use only if correctly verified.

12. The method of claim 6, wherein the SI protection information comprises at least one of:
   cells for which the SI shall have the SI signature; and/or
   SI numbers which shall be covered by the SI signature; and/or
   a public key for SI signature verification.

13. The method of claim 6, wherein the node is a radio network node or a Core Network (CN) node.

14. The method of claim 6, wherein the SI protection information is provided to the UE after Non-Access Stratum (NAS) security activation.

15. The method of claim 6, comprising:
   determining that SI protection information should not be provided to UEs not providing the information indicating the SI protection capability nor to UEs having information indicating the SI protection capability that does not fulfil a criterion; and
   determining which UEs of a plurality of UEs that should not be provided with the SI protection capability information.

16. A node in a communications system, the node comprising radio circuitry and processing circuitry operatively coupled to the radio circuitry, wherein the processing circuitry is configured to:
   obtain information indicating System Information (SI) protection capability from a User Equipment (UE), wherein the SI protection capability is associated with the UE's capability to verify SI signatures and need to verify SI signatures;
   determine SI protection information based on the information indicating SI protection capability; and to
   provide the determined SI protection information to the UE.

17. The node of claim 16, wherein the processing circuitry is configured to:
   determine which UE of a plurality of UEs that should be provided with the determined SI protection information, wherein the determining is done based on the information indicating the SI protection capability.

18. The node of claim 16, wherein the processing circuitry is configured to:
   determine which version of the SI protection information that should be provided to the UE, wherein different versions of the SI protection information can be provided to different UEs.

19. The node of claim 16, wherein the SI protection capability indicates at least one of:
   whether or not the UE supports SI signature verification; and/or
   whether or not the UE supports clock or time information in SI signature calculation; and/or
   whether or not the UE supports geographical location information in SI signature calculation; and/or
   which cryptographic primitives of signature schemes does the UE support; and/or
   which SI messages that are time critical; and/or
   which SI messages the UE needs to use only if correctly verified.

20. The node of claim 16, wherein the SI protection information comprises at least one of:
   cells for which the SI shall have the SI signature; and/or
   SI numbers which shall be covered by the SI signature; and/or
   a public key for SI signature verification.

* * * * *